April 16, 1940.                     J. O. HEINZE                     2,197,499
                                  ROLLER BEARING
                              Filed Jan. 19, 1938                3 Sheets-Sheet 1
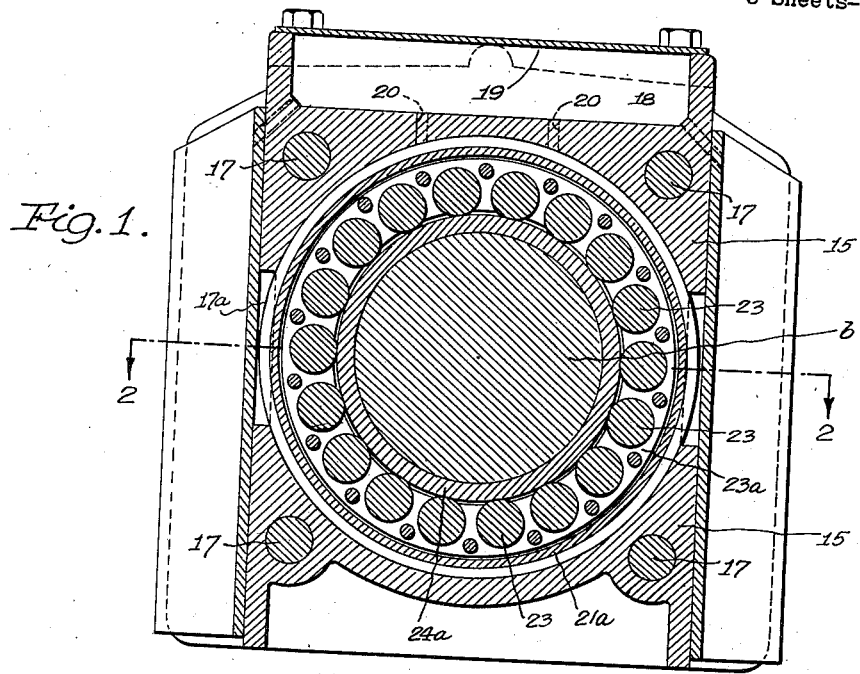
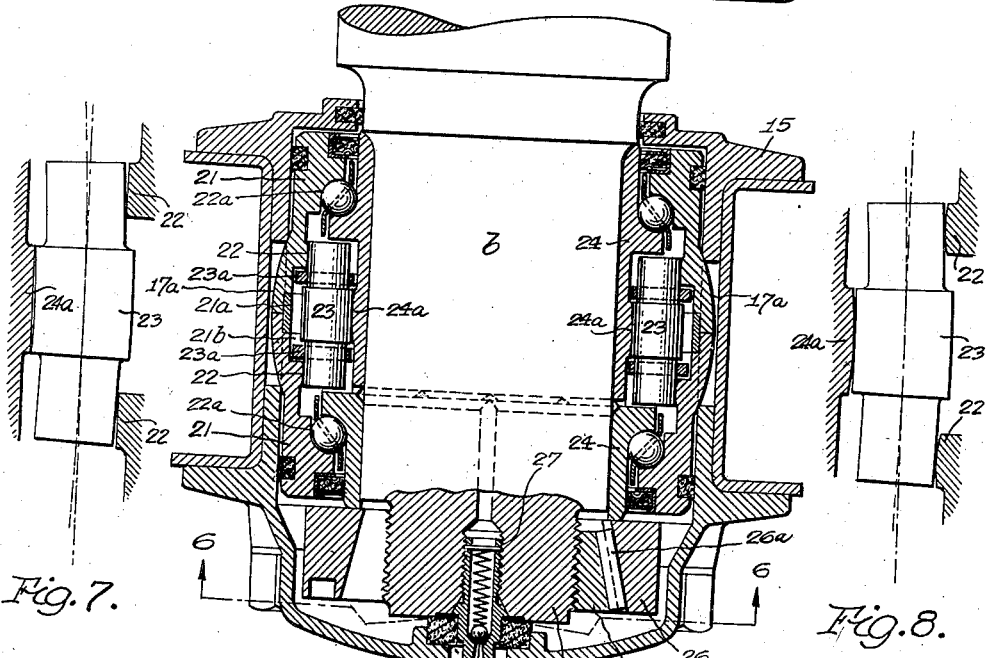
Inventor
John O. Heinze,
By
Attorneys

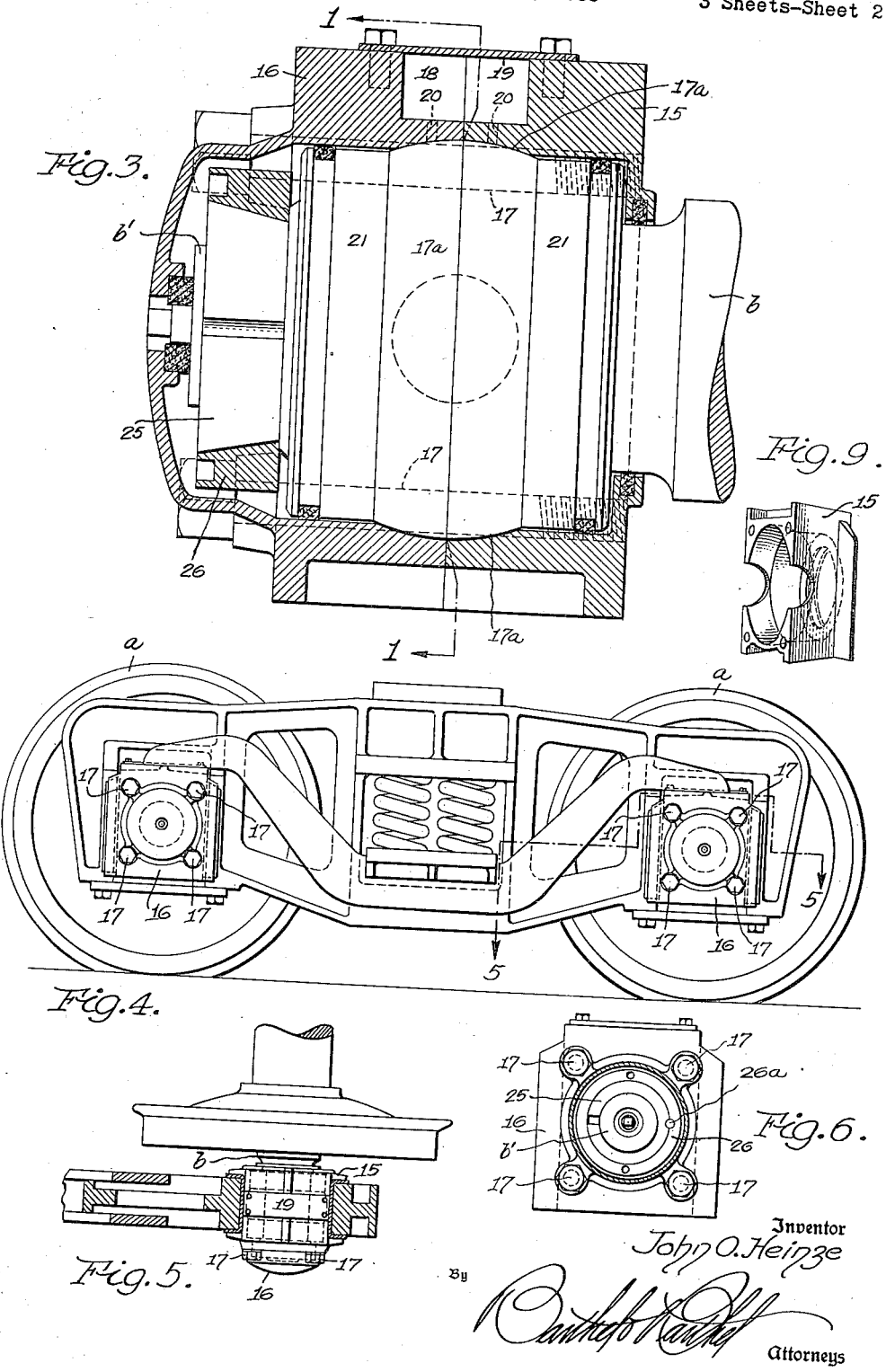

April 16, 1940.  J. O. HEINZE  2,197,499
ROLLER BEARING
Filed Jan. 19, 1938   3 Sheets-Sheet 3
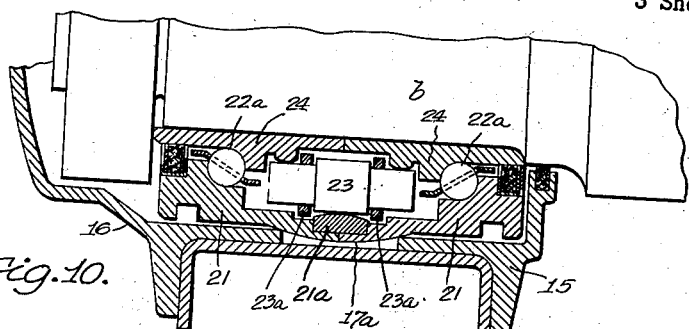
Fig. 10.
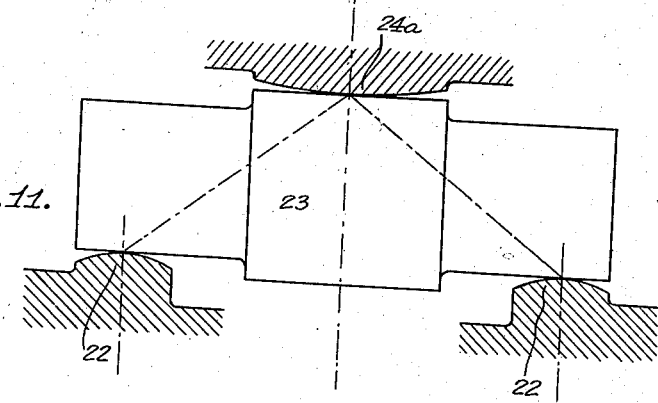
Fig. 11.
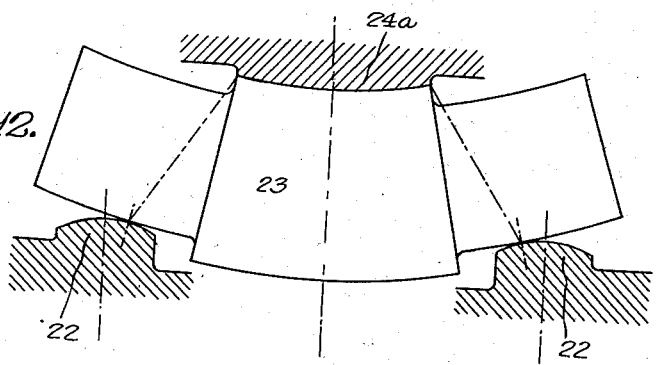
Fig. 12.
Inventor
John O. Heinze,
By
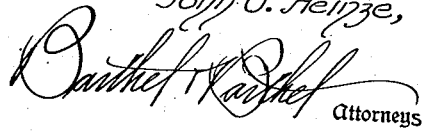
Attorneys Patented Apr. 16, 1940

2,197,499

UNITED STATES PATENT OFFICE 2,197,499

ROLLER BEARING

John O. Heinze, Detroit, Mich., assignor to Heinze Development Company, Detroit, Mich., a corporation of Michigan Application January 19, 1938, Serial No. 185,689

5 Claims. (Cl. 308—180)

This invention relates to improvements in journal bearings and pertains more particularly to assemblages of this type designed for service under heavy load conditions—illustrated for instance, by service in the axle or journal boxes of railway cars, engines, etc., although usable under less onerous conditions.

The roller bearing according to the present invention comprises inner and outer race members and a plurality of rollers in spaced relation within the race, one of said race members having bearing contact with a roller within a zone central of the length of said roller and the other race member having bearing contact with said roller in two zones spaced one at each side of the central zone, and it is characterized in that the distance between the central zone and each of the end zones is sufficient to provide leverage characteristics and to cause the roller axis to be deflected from its normal position when the roller is subjected to loads above a predetermined value, whereby the load is distributed over a plurality of adjacent rollers, the rollers and race members being so designed as to allow said rollers to deflect and means being provided to limit this deflection.

In addition, the assembly permits a compensating effect designed to meet the conditions of deflection. This is brought about by arranging the raceway for each contact point as a convex surface on a cross-section of the race member, the opposing faces of roll and race surface thus presenting a tangential effect. As a result, the several contacts, with no roll deflection, will be point contacts with a maximum spacing between such points. As the roll deflects, the central point becomes of zonal type linear of the roll, with the zone length increasing with the deflection value increase; at the same time the roll deflection will tend to cause the respective end zones of the roll to shift the point of contact on the individual race surface in a direction to decrease the spacing distance of the two points of contact.

In addition, the assembly provides a safety factor of importance. The bearings include means for meeting thrust conditions, this being in the form of a pair of raceways for balls, each of these raceways being located but spaced from an end of the roll, and serving to resist thrust action of the bearing.

Hence, the bearing assembly provides for the deflection characteristics within a range which generally represents the normal operations of the car or engine, but in presence of an abnormal condition which could be damaging in effect, the bearing adds the effect of a ball bearing of unyielding type.

The advantage of this lies in the fact that during normal operation the load is being supported on the basis of the roll support with the relative yield such as ensures that the load is being distributed through a plurality of rolls at all times, and yet provides a limit beyond which the yield effect cannot pass, regardless of service conditions.

The bearing assembly of the present invention is therefore an assembly designed particularly to meet the extremely onerous conditions of heavy load activities and under service conditions extremely onerous, doing this by ensuring at all times a load distribution over a plurality of rolls even when the latter have the usual manufacturing allowances to meet the heavy load duty, and at the same time provide a bearing which will automatically compensate for the inevitable axle expansion when braking, hammer blow effects set up by track conditions, elimination of noise, etc.

To these and other ends therefore, the nature of which will be made more apparent as the invention is hereinafter described in detail, this invention consists in the construction and arrangement of elements and parts all as hereinafter disclosed in the following description, illustrated in the accompanying drawings, and more particularly pointed out in the appended claims.

In the accompanying drawings, in which similar reference characters indicate similar parts in each of the views:

Figure 1 is a vertical section through an axle box or journal of a heavy-duty assemblage, the section being taken on line 1—1 of Fig. 3;

Fig. 2 is a horizontal section of the same, taken on the line 2—2 of Fig. 1;

Fig. 3 is a view, partly in section and partly in elevation taken in the direction of the axis of the axle;

Fig. 4 is a side elevation of a car truck, the bearings of which include the present invention;

Fig. 5 is a detail sectional view taken on line 5—5 of Fig. 4;

Fig. 6 is a view taken on line 6—6 of Fig. 2;

Fig. 7 is a view illustrating the conditions set up by a deflection of a roll with one type of raceway faces;

Fig. 8 is a view similar to Fig. 7 but with the raceway faces arranged in accordance with the preferred form of the present invention;

Fig. 9 is a detail perspective view of the journal box closure;

Fig. 10 is a fragmentary sectional view showing a modified arrangement of the three-point bearing;

Fig. 11 is a fragmentary detail section on an enlarged scale, showing the leverage characteristics present when the load is insufficient to cause roll deflection, and Fig. 12 is a view similar to Fig. 11, illustrating the leverage conditions present when the roll is under maximum deflection, which deflection is greatly exaggerated.

As pointed out above, the invention is designed more particularly to meet the conditions of heavy load service, and to illustrate a characteristic service of this type, the invention is shown applied as the journal bearings for the axles of a railway truck, Fig. 4 presenting a view of a conventional truck of this type with the invention applied. The truck is shown with a pair of wheels $a$ of the usual type in which the axle has projecting ends $b$ which are received by the axle or journal boxes carried by the frame of the truck. The brakes are not shown, but co-operate with the wheel treads during braking operations; being of the usual type, a metal-to-metal contact with the wheels is present during braking, thus setting up high friction values with resultant development of heat; with the axle and wheels unitary, the developed heat reaches to the axle and if not rapidly dissipated, reaches the axle ends $b$, tending to cause expansion of the latter. The details in this connection are not presented herein since they are well known in railway service, it being sufficient to state that the heat values thus developed have at times become so great as to cause discoloration of the ends of the axle and affecting the temper of the metal; in addition, the axle expansion inherently present affects the operation, and is one of the reasons for the common use of softer metal bearing structures or brasses which aid in the heat dissipation due to large surface contact with the axle, but which have a limiting effect upon train speed in service, due to such contact.

Journal bearings using rolls permit higher operating speeds, but, due to limited surface contact, heat dissipation is less rapid with the result that greater axle expansion is possible, thus placing the rolls under heavy compression conditions; it is the practice, where rolls are used, to provide the assembly as "sloppy" in order to reduce the effect of the expansion on the rolls as far as possible, but this form of assemblage tends to the creation of noise; and even with this form the speed maximum is reduced, due to the fact that greater friction is required in braking at higher speeds, and with limited dissipation of heat, the axle heat increases so that the resultant expansion may even serve to crush the rolls in spite of the "sloppy" assembly. These conditions are well known, and tend to limit speeds in operation to values such that the needed braking friction will remain within limits such as to prevent axle expansion beyond limits permitted by loose roll assembly.

As indicated in Figs. 1, 2 and 3, the axle housing is formed sectional, and comprises an inner member 15, and an outer end or face member 16, these members being externally shaped to fit frame members, and being arranged to be secured together, face to face by bolts or other securing means 17 (Fig. 1) so as to form an internal space to receive the axle end and bearing assembly. The upper portion of the housing is formed with a large recess 18, closed by a removable plate 19, the recess being designed to receive a supply of lubricant for the bearing, the recess having a plurality of ports 20 extending through its bottom wall into the bearing receiving space of the housing.

The outer race member is formed of two sections 21, 21, these being substantial duplicates, each being annular and arranged in axial alinement, being preferably symmetrically disposed to provide an abutting relationship midway of the length of the bearing, an annular member 21a underlying the meeting line of the two sections. Since, in the present invention, the roll zone is central—with a thrust bearing zone on each side of such roll zone—the sections have cross-sectional configurations designed to permit the location of these zones, with the result that the central zone is generally of greater external diameter than the end zones, the external configuration of the central zone being preferably curved as shown in Fig. 3, the side walls of members 15 and 16 being recessed to receive this portion of the race member, as shown in Fig. 2.

The internal configuration of the outer race member will depend upon the form in which the three-point characteristic is provided. For instance, in Fig. 2 the roll contact midway of its length is with the inner race member, while its contact with the outer race member is at spaced points intermediate the roll center and the roll ends. In the form shown in Fig. 10, these conditions are reversed, the outer race member contacting the center of the roll. Either form may be employed, and the internal configuration of the outer race member will be arranged correspondingly with the selection of the form to be used. For instance, in the form of Fig. 2, the central zone 21b of the composite outer race member is spaced from the roll face, the distance being sufficient to provide free roll deflection for the maximum deflection desired of the roll. The end walls of the recess thus formed each form a wall of the portion which forms the actual raceway 22 for an end zone of the roll, the outer race member in this form carrying two of such raceways; as indicated in Figs. 8, 11 and 12, these raceways each have the active face as convex, so that although the face of the race has considerable length, its contact with the roll is practically that of a point contact, the particular location of the point being dependent upon the deflection value of the roll at any instant.

While not limited to such form, the roll 23 is itself shown as of the two-diameter type, with the smaller diameter forming the end zones. This type not only provides for slower planeting but also permits the readier use of means for preventing endwise creeping of rolls, this means being shown as in the form of elements 23a located at the ends of the roll central zone, extending into the space 21b, and surrounding the smaller diameter zone. Rolls of uniform diameter may be utilized, however, in which case the anti-creeping means is of a somewhat different type.

Beyond the roll zone of the composite outer race member, the internal configuration of the latter, at each end, is arranged to set up the characteristics of the outer raceway 22a of a ball-bearing zone, with the latter designed to operate normally to resist thrust conditions. To enable roll deflection, however, the raceway is arranged to permit sufficient movement of the race members relative to each other within predetermined limits before the ball contacts with the race on the race face corresponding to a radius of the bearing, the race face in the thrust direction having the usual characteristic, with the ball cage being properly arranged to maintain the ball positions under this change from the usual formation of ball raceways.

It will be noted that the assembly including the inner or outer races, the rolls, balls and their races, forms a bearing unit for the support of the axle end within the journal box, and that this unit centers the axle end or journal within the box longitudinally thereof by forming the outer raceway with an exterior annular projection 17a which is provided with an outer surface curved longitudinally of the axle to fit within an interior groove in the parts 15—16 of the box, and therefore the unit assembly is movable, upon binding movement of the axle as a whole, about a central point or axis of the formation of the curved surface of the annular projection.

Referring to Fig. 2, the inner race member 24 is also a composite member, the two sections, however being of dissimilar configurations. In this form the central zone of the roll is in contact with the inner race member, and hence the race face 24a is formed integral with the inner section of the member, and, like the race faces of the outer member, this face is preferably made convex. As indicated in Figs. 11 and 12, this latter arrangement sets up the characteristic of a point contact with the central zone of the roll in the absence of deflection of the latter, but when roll deflection is present this point lengthens out into a line zone the length of which is determined by the deflection value. The end zone of the inner section of the inner race member and as well as the outer section have configurations to provide the complemental race faces for the thrust ball bearings. The inner race member is carried by the axle.

In the form of Fig. 10, the reversal of the three point suspension places the central point of contact as with the outer race member—in which case the annular member 21a presents the race face, the latter being convexed. Since the inner race member now provides the two spaced point contact, the two sections can be substantial duplicates, the two race-faces for the rolls being properly located to produce the desired result, with each face convexed. In this form, the ball raceways can be varied from the form of Fig. 2, with the outer race member presenting the normal relationship with the ball and with the raceway of the inner race-member arranged with the deflection-permitting space referred to.

The race members are held in position by suitable locking mechanism carried by the end of the axle b. For instance, the end of the latter may have a reduced portion b' which is externally threaded, and designed to receive a two-part collar 25, 26, the former being internally threaded and having a conical external face, the member 26 being annular, but split, and having an internal face complemental to the conical face of member 25. When the bearing is assembled in position, member 26 is brought into contact with the outer section of the inner race member, after which member 25 is threaded to its position, the opposing conical faces serving to move member 26 to locate the bearing parts in the proper positions. A locking pin 26a serves to hold the members in position.

The axle also carries an axial lubricant passage within a chamber having lateral outlets into the bearing zones. Any suitable closure means for this supply may be employed, the drawings indicating a simple arrangement in the form of a tubular structure 27 extending outwardly from the axle end into an opening in the outer housing member 16, and having a supply opening normally closed by a check-valve in the form of a ball 27a.

As indicated, suitable dust-excluding structures are employed at desired points.

As indicated above, an underlying feature of the present invention is the fact that the rolls are supported in such manner as to permit a controlled yield relationship between the axle and the load-carrying super-structure, this result being obtained by deflection of rolls, with the deflection changing the roll axis from a straight line to approximately a curved line characteristic. To provide this result, the race faces are arranged along the lines of a "three-point" mounting for the roll, with two of the points spaced apart on one side of the roll, the third point being on the opposite side of the roll intermediate the two spaced points. Obviously, to permit a deflection action of the rolls, without danger of roll-shearing effects, it is essential that the spacing of the points of contact be sufficient as to provide this action, and, at the same time, set up the proper leverage conditions as illustrated in Figs. 11–12 which will enable proper control of the deflection. As it is apparent that the greater the distance between points the greater becomes the leverage value and less resistance by the roll, the particular distance between points will depend upon the conditions which the bearing is to meet. Consequently, the bearing dimensions are more or less individual to the particular conditions to be met.

It has been found that if the assembly is formed in such manner that a roll will deflect .001" for each 2000 pounds of load beyond a minimum load, the best results will be obtained; such deflection values will permit car loadings to maximum capacity and still be within safety limits. This is made possible through the fact that, since deflection of rolls is possible, the load weight is distributed over a plurality of rolls— in an assembly having eighteen rolls, the load becomes distributed over seven of them, with each roll taking a share of the load weight— thus causing each of the active rolls to be deflected concurrently, with each roll presenting its resistance to deflection to aid the resistance value of adjacent rolls. Consequently, the heavy weights presented in railway service can be adequately cared for without liability of damaging the rolls, since the rolls cannot reach a straining point due to the presence of the deflection-limiting feature set up by the ball bearings. It has been found that the rolls can be deflected at least .008" with safety, and since this range of deflection will meet the various service conditions even when abnormal, the values above indicated as a basis for dimensioning the bearing are deemed preferable.

As is apparent the contact between a roll and raceways is such that leverage characteristics are present or possible at all times, due to the spacing of the contact points lengthwise of the roll. The maximum length of line of contact of the single contact side of the roll is always less than the minimum distance between the pair of contact points of the opposite side of the roll, with the excess of the latter distance of material value and sufficient to set up the leverage characteristic. The distances are determined mathematically and are dependent upon the conditions of the service to be rendered, the values of the resistance of the rolls to deflection being known. The character of the roll— whether of uniform diameter or of two or more diameter characteristic—is considered in the mathematical calculations since the resistance value of the roll to deflection may vary between the different types; but in any case the spacing is such as to set up the leverage characteristic through the excess spacing between the pair of contact points.

While the contact faces of the race members may extend in a straight line, as in Fig. 7, it is preferred that such faces be convex instead of straight, as indicated in Fig. 8. The reason for the preference is indicated in these two views. As indicated in Fig. 7, the straight face form, in presence of roll deflection, sets up less favorable conditions. For instance, on the single contact side of the roll, the roll in non-deflected form will present a line contact with the roll, but under roll deflection, this changes to a spaced-point contact; similarity, the undeflected roll would have a line contact with the spaced race faces on the opposite side of the rolls, but would become a single point of contact under roll deflection. As is obvious, however, the leverage conditions remain constant with this form.

On the contrary, in the form of Fig. 8, in which the race member faces are convex (the roll faces being straight or of constant diameter) the contact between the roll and such faces will be that of a point contact where the roll is not deflected, with the contact point at the apex of the convexity; this is clearly indicated in Fig. 11, where indicates, in dotted lines, the length of the leverage at such time with the leverage value at its maximum. When roll deflection takes place, the contact of the roll with the single contact race face changes from the point characteristic to a line characteristic, as indicated in Fig. 12, with the length of the line contact dependent upon the value of the roll deflection. At the same time, the roll deflection changes the point of contact of the opposite side of the roll with each of the pair of contacts, by shifting such point inward, the amount of shift depending upon the value of the roll deflection; the two changes serve to vary the leverage value, as is indicated by a comparison of Figs. 11 and 12, the latter presenting, in dotted lines, the length of the leverage under maximum roll deflection. Obviously, deflection values intermediate those shown will cause changes in leverage values as between those indicated.

In other words, with the deflection of the roll at zero value, the leverage conditions present provide the least resistance to deflection of the roll. As deflection proceeds the leverage conditions automatically change in the direction of increasing the resistance to deflection by decrease of the leverage value. Hence, the roll resistance to deflection is least at the beginning of deflection and therefore more sensitive to the effect of the load, a desirable condition since it ensures load distribution over a plurality of rolls, when the load exceeds the minimum for which the bearing is designed. If the load value above the minimum is comparatively small the change in leverage conditions is small and the bearing remains in such sensitive zone excepting under heavy abnormal conditions. When the load value above the minimum is large, roll deflection is materially increased, with the increase serving to change the leverage conditions to render the roll more resistant to deflection, but inasmuch as the change is relative to the conditions of Fig. 11, it will be understood that the increase in roll resistance follows the initial change so that the distribution of the load over the plurality of rolls is present throughout the change in leverage values.

The maximum resistance to deflection is reached as the roll deflection of the bearing reaches the maximum deflection for which the bearing is designed. At such time the leverage value is lowest, as indicated in Fig. 12. Hence, when the limit is reached and the ball-bearings begin to function as load-sustaining structures, the roll resistance to deflection has so increased that the ball-bearing contact can be had without material shock in addition to which the rolls remain active in the support of the load under conditions where the leverage conditions although of material value are at their lowest value in the range of leverage values for which the bearing is designed.

Due to the fact the bearing requires no provision for the factors of axle expansion and of hammer-blow effects, there is no requirement of a "sloppy" assembly, with the result that the structural development can be simplified to permit ready assembly and attention, and at the same time provide for sturdy construction to aid in maintaining long-life service characteristics, as well as relatively low cost production and maintenance.

While I have disclosed several ways in which the underlying principles of the invention can be utilized in producing the desired results, it will be understood that variations and modifications therein may be found desirable or essential in meeting the exigencies of particular service conditions or the preferences of users, and I therefore desire it to be understood that I reserve the right to make any and all such changes or modifications therein as may be found desirable or essential insofar as the same may come within the spirit and scope of the invention as expressed in the accompanying claims when broadly construed.

What is claimed as new is:

1. In journal bearings for service under heavy load conditions, wherein the bearing is formed to support the load with the load distributed over a plurality of adjacent rolls to provide a load support of zonal characteristics under normal running conditions, the combination of, inner and outer race members, a plurality of rolls in spaced relation within the race, said race members combinedly presenting annular track surfaces within the race to provide bearing contact of a roll with one of said members within a zone central of the length of the roll and a bearing contact of the roll with the other member in a pair of zones spaced apart a distance sufficient to locate each zone of the pair as lying outside of such central zone a distance sufficient to provide leverage characteristics between the central zone and each of the pair of zones to thereby cause the roll axis to be varied from its repose status by roll deflection in presence of predetermined load values and thereby distribute load application over a plurality of adjacent rolls, with the deflection value of the respective rolls of the load-supporting zone decreasing towards the end of such load-supporting zone, and a pair of ball bearing formations operating normally as thrust bearings and arranged to be rendered active automatically as supplementing load-supporting bearings in presence of a predetermined deflection value of the rolls to thereby limit the range of roll deflection in presence of abnormal service conditions.

2. In journal bearings for service under heavy load conditions, wherein the bearing is formed to support the load with the load distributed over a plurality of adjacent rolls to provide a load support of zonal characteristic under normal running conditions, the combination of, inner and outer race members, a plurality of rolls in spaced relation within the race, said race members combinedly presenting annular track surfaces within the race to provide bearing contact of a roll with one of said members within a zone central of the length of the roll and a bearing contact of the roll with the other member in a pair of zones spaced apart a distance sufficient to locate each zone of the pair as lying outside of such central zone a distance sufficient to provide leverage characteristics between the central zone and each of the pair of zones to thereby cause the roll axis to be varied from its repose status by roll deflection in presence of predetermined load values and thereby distribute load application over a plurality of adjacent rolls with the deflection value of the respective rolls of the load-supporting zone decreasing towards the end of such load-supporting zone, and means in the form of member faces forming portions of the race member assembly with such faces co-operative to produce a pair of ball thrust raceways respectively lying outside of the roll race, with one ball race face normally inactive with the balls of the ball bearing in direction radially of the bearing but movable into ball contact for activity to sustain load weight in presence of roll deflection of predetermined value to thereby limit the range of roll deflection.

3. In journal bearings for service under heavy load conditions, and in combination, inner and outer race members, and a plurality of rolls in spaced relation within the race, said race members combinedly presenting annular track surfaces contacting the rolls at spaced locations in the length of the rolls with the spacing such as to provide leverage characteristics between the central zone of a roll and the end zones of such roll, the leverage being substantially symmetrical on opposite sides of the mid point in the roll length, whereby load values beyond a predetermined minimum value will product deflection of the roll within the roll length, said track surfaces having a cross-sectional contour varied from the roll contour opposing each surface to thereby cause variations in leverage values by variations in roll deflection values, the leverage variations being in directions to decrease the leverage value as the deflection value increases and to increase leverage values as the deflection values decrease, the bearing including a pair of thrust ball races normally inactive to affect roll deflection but rendered active in supplementary supporting the load by roll deflection of predetermined value to thereby limit the range of roll deflection.

4. In journal bearings for service under heavy load conditions, and in combination, inner and outer race members, and a plurality of rolls in spaced relation within the race, said race members combinedly presenting annular track surfaces contacting the rolls at spaced locations in the length of the rolls with the spacing such as to provide leverage characteristics between the central zone of a roll and the end zones of such roll, the leverage being substantially symmetrical on opposite sides of the mid point in the roll length, whereby load values beyond a predetermined minimum value will produce deflection of the roll within the roll length, said track surfaces having a cross-sectional contour varied from the roll contour opposing each surface to thereby cause variations in leverage values by variations in roll deflection values, the leverage variations being in directions to decrease the variations being in directions to decrease the leverage value as the deflection value increases and to increase leverage values as the deflection values decrease, the bearing including a pair of thrust ball races normally inactive to affect roll deflection but rendered active in supporting the load by roll deflection of predetermined value to thereby limit the range of roll deflection, such supplemental load-support activity of the thrust bearings serving to provide the minimum limit to the range of leverage values.

5. In antifriction bearings for the axles of railway rolling stock, wherein the bearing is formed to support the load with the load distributed over a plurality of adjacent rolls to provide a load support of zonal characteristic under normal running conditions, the combination of, a sectional housing for receiving an end of the wheel axle, an inner race member carried by such axle end, an outer race member within the housing, and a plurality of rolls in spaced relation within the race, said race members combinedly presenting annular track surfaces within the race to provide bearing contact of a roll with one of said members within a zone central of the length of the roll and a bearing contact of the roll with the other member in a pair of zones spaced apart a distance sufficient to provide leverage characteristics between the central zone and each of the pair of zones, whereby load values beyond a predetermined minimum value will produce deflection of the roll within the roll length, said members having ball-race faces to receive the balls of a pair of ball bearings operative as thrust bearings, said ball-race faces including configurations adapted to normally render the balls inactive in supporting the load but adapted to be rendered active in such load support in presence of a predetermined deflection value of the rolls.

JOHN O. HEINZE.